(12) United States Patent
Castro et al.

(10) Patent No.: US 7,322,784 B2
(45) Date of Patent: Jan. 29, 2008

(54) FEMALE ATTACHMENT AND OBTURATOR INCLUDING IT

(75) Inventors: Dominique Castro, La Rue Saint Pierre (FR); Bogdan Chrzastek, Bussy Saint-Georges (FR)

(73) Assignee: ITW de France, Beauchamp (FR)

( * ) Notice: Subject to any disclaimer, the term of this patent is extended or adjusted under 35 U.S.C. 154(b) by 31 days.

(21) Appl. No.: 11/145,973

(22) Filed: Jun. 7, 2005

(65) Prior Publication Data

US 2006/0034671 A1 Feb. 16, 2006

(30) Foreign Application Priority Data

Jul. 30, 2004 (FR) .................................. 04 08468

(51) Int. Cl.
*F16B 37/16* (2006.01)
*F16B 21/00* (2006.01)
(52) U.S. Cl. .................... 411/433; 411/512; 411/437
(58) Field of Classification Search ............... 411/433, 411/512, 437, 431
See application file for complete search history.

(56) References Cited

U.S. PATENT DOCUMENTS

| 4,671,717 | A | | 6/1987 | Fukuhara |
| 4,828,444 | A | * | 5/1989 | Oshida ........................ 411/437 |
| 4,934,889 | A | * | 6/1990 | Kurosaki ..................... 411/433 |
| 4,999,019 | A | * | 3/1991 | Kraus .......................... 411/512 |
| 5,098,242 | A | | 3/1992 | Schaty |
| 5,291,639 | A | * | 3/1994 | Baum et al. .................. 24/297 |
| 5,598,994 | A | * | 2/1997 | Olewinski et al. ............ 248/73 |
| 5,816,762 | A | * | 10/1998 | Miura et al. ................ 411/433 |
| 5,902,085 | A | * | 5/1999 | Yuta ............................ 411/433 |
| 6,070,836 | A | * | 6/2000 | Battie et al. ............... 248/68.1 |
| 6,155,762 | A | * | 12/2000 | Courtin ...................... 411/512 |
| 7,066,701 | B2 | * | 6/2006 | Kovac ........................ 411/433 |

FOREIGN PATENT DOCUMENTS

| DE | 33 38 963 A1 | 5/1985 |
| DE | 196 28 461 A1 | 1/1997 |

* cited by examiner

*Primary Examiner*—Flemming Saether
*Assistant Examiner*—David C Reese

(57) ABSTRACT

The female attachment, which is made of plastics material, has a recess and at least two lugs projecting into the recess for clipping it to a stud. It includes connecting members extending between a first body and a second body and delimiting the recess, the connecting members comprising at least one rigid arm and at least two flexible strips separated from each other. The obturator includes a female attachment of the above kind and a skirt.

7 Claims, 2 Drawing Sheets

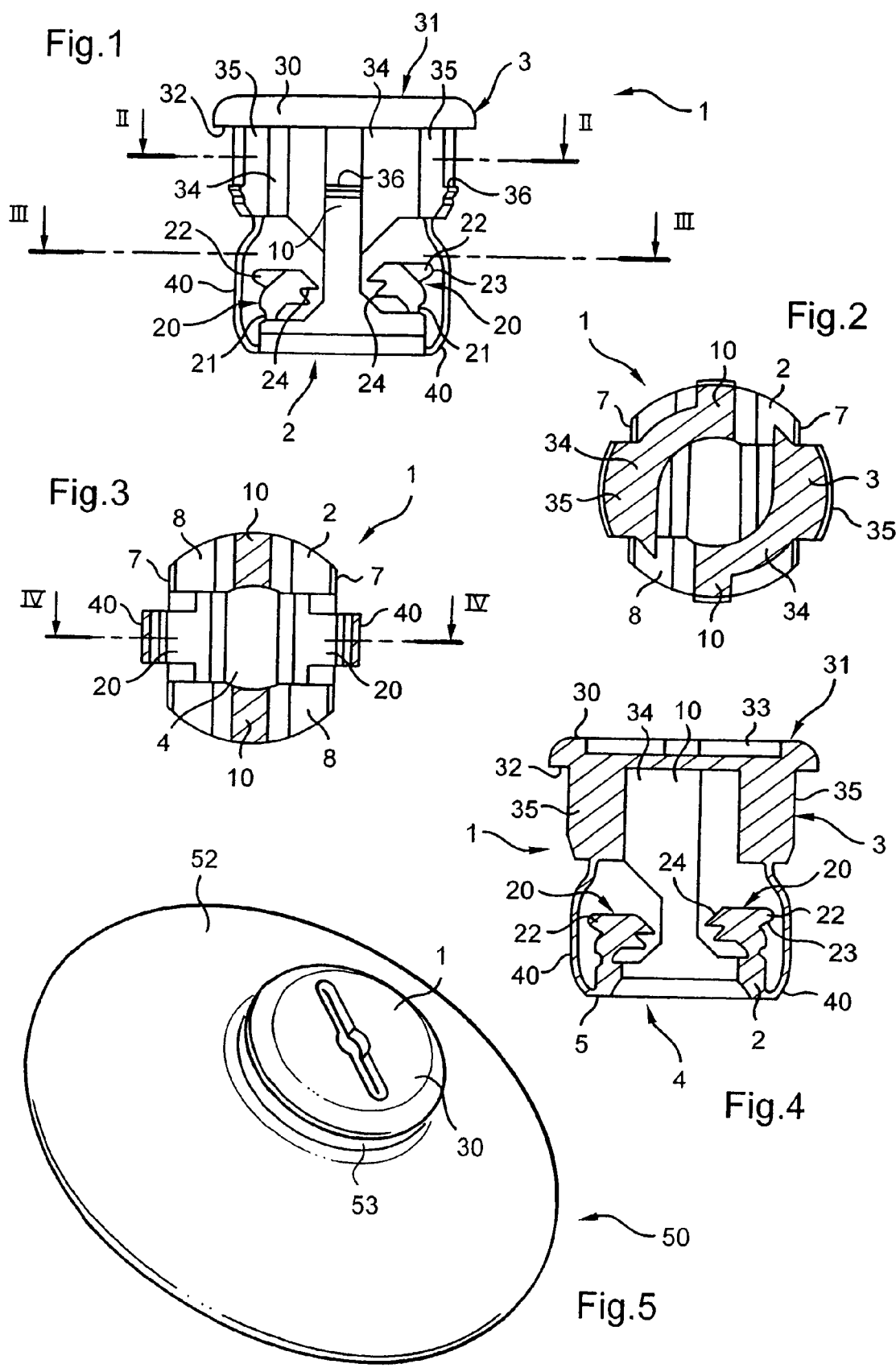

FEMALE ATTACHMENT AND OBTURATOR INCLUDING IT

RELATED APPLICATIONS

The present application is based on, and claims priority from, French Application Number 0408468, filed Jul. 30, 2004, the disclosure of which is hereby incorporated by reference herein in its entirety.

FIELD OF THE INVENTION

The invention relates generally to female attachments of plastics material.

BACKGROUND OF THE INVENTION

There are prior art female attachments of plastics material featuring a recess and at least two lugs projecting into said recess for attaching said attachment to a stud engaged in said recess.

In particular, the document U.S. Pat. No. 5,098,242 discloses an attachment of the above kind that includes a body having a central opening through which the recess opens. The attachment has three projecting lugs rooted in the vicinity of the opening.

The end of the lugs can be deformed elastically so that the attachments can be fitted over the stud.

The free end of each lug is wedge-shaped and locates in the hollow of the thread on the stud.

In addition to the lugs, studs situated above the lugs are provided for screwing and unscrewing the stud.

SUMMARY OF THE INVENTION

The invention aims to provide a female attachment of plastics material of the above type offering the possibility of cooperating with a plurality of types of studs each having a different diameter, whilst being particularly simple and convenient to manufacture and to use.

To this end the invention proposes a female attachment of plastics material having a recess and at least two lugs projecting into said recess for clipping said attachment to a stud engaged in said recess, which attachment is characterized in that it comprises:

at a first end, a first body having a central opening,
at a second end, opposite said first end, a second body, and
connecting members extending between said first body and said second body and delimiting said recess, which is open at said first end via said central opening of said first body, said connecting members comprising at least one rigid arm and at least two flexible strips that are separated from each other, each of said strips being disposed facing one of said clipping lugs, opposite said recess, each of said lugs being connected to said first body and comprising a rigid portion having teeth adapted to engage with the thread of said stud and a toe opposite said teeth facing a respective one of said strips.

Accordingly, upon engaging a stud in the recess of the attachment, the lugs move apart by a distance corresponding to the diameter of the stud without being impeded by the flexible strips, with the result that the force needed to press it in may be moderate. If traction is applied to the attachment to pull it out, at least one of the strips is stretched firmly and the respective lug is held against the stud, which provides a particularly high resistance to pulling out.

According to features of the invention that are particularly simple and convenient to manufacture and to use:

the teeth comprise two adjacent wedge members adapted to engage with said thread; and/or
each of said lugs has a free end opposite said first body, at least one lug having its free end axially offset relative to the free end of another lug; and/or
each of said lugs comprises a portion forming a hinge between said rigid portion and said first body; and/or
said attachment comprises exactly two arms and two lugs, said arms and said lugs being disposed in a regularly alternating manner; and/or
said first body has a beveled rim facing said recess along said opening; and/or
a flange of arcuate shape connected to said second body extends from each of said arms in the direction of the opposite arm, each of said strips being connected to a respective one of said flanges.

The invention also proposes an obturator adapted to be fixed to a stud, characterized in that it comprises an attachment according to any preceding claim and a skirt, said attachment and said skirt comprising mutual nesting means, and, optionally:

said second body has a rim disposed radially relative to the connecting members and said skirt has a central orifice flanked by a projecting circular rib, said rib being abutted against said rim; and/or
said skirt is made of plastics material that is more flexible than that of said attachment.

BRIEF DESCRIPTION OF THE DRAWING

Features and advantages of the invention will emerge from the following description, which is given by way of preferred but non-limiting example and with reference to the appended drawings, in which:

FIG. 1 is a view in elevation of a female attachment of the invention;
FIG. 2 is a view of it in section taken along the line II-II in FIG. 1;
FIG. 3 is a view of it in section taken along the line III-III in FIG. 1;
FIG. 4 is a view of it in section taken along the line IV-IV in FIG. 3;
FIG. 5 is a perspective view of the attachment provided with a skirt to form an obturator of the invention.

DETAILED DESCRIPTION OF THE INVENTION

Figure 6:
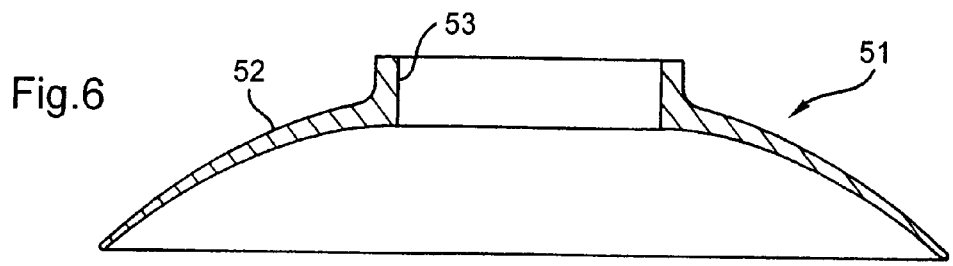
FIG. 6 is a view of the skirt in section in a plane passing through its axis.
Figure 7:
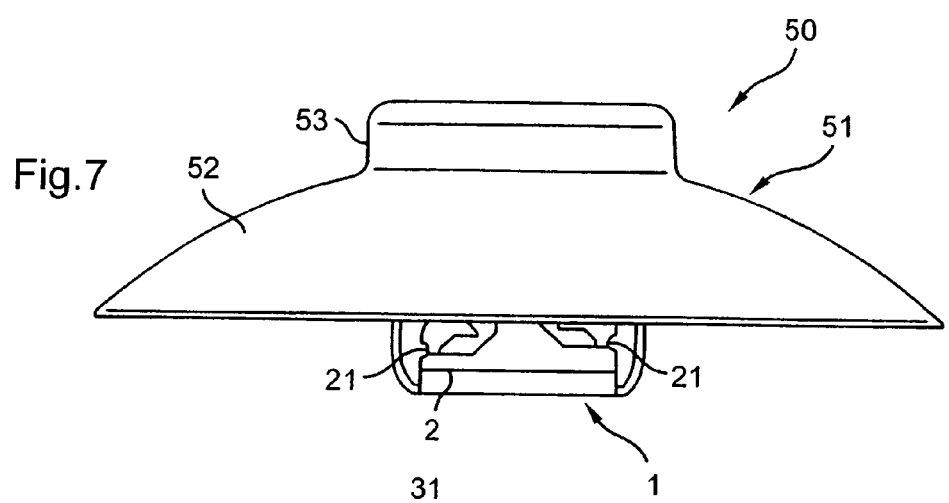
FIG. 7 is a view in elevation of the FIG. 5 obturator.

The attachment 1 is molded in one piece from plastics material. It has a generally cylindrical structure extending between a first body, here a ring 2, and a second body 3. The attachment 1 includes a recess.

The ring 2 includes a circular central opening 4 through which a stud can pass towards the recess.

The ring 2 has an exterior surface 5 extending around the opening 4. Starting from this exterior surface 5, the ring 2 has two beveled edges, one leading to the opening 4 and facilitating the passage of the stud and the other leading to the outside and facilitating the insertion of the attachment 1 into another member such as a skirt.

The ring 2 includes two parallel and diametrally opposed lateral flats 7.

There are two upstanding transverse rigid arms 10 of substantially parallelepiped shape on an annular interior surface 8 opposite the exterior surface 5, half way between the two flats 7. The two arms 10 extend between the ring 2 and the second body 3. The arms 10 divide the ring 2 into two portions, one of which is thicker than the other (FIG. 1). The interior surface 8 has two separate levels whereas the exterior surface 5 is flat.

There are two facing lugs 20 on the surface 8, at the level of the center of the flats 7. Each of the lugs 20 is rooted on the interior surface 8 at the border with a flat 7. The two lugs 20 are the same shape and the same size.

Each lug 20 has a constant profile and is attached to the interior surface 8 by a root 21 (FIG. 1). The root 21 is thin, the lug 20 widening after the root 21.

The section of the lug 20 has four sides.

The surface from which the root 21 projects is flat and faces the interior surface 8 of the ring 2. The root 21 is in the vicinity of the edge shared with a second surface.

The second surface lies on the exterior, opposite the recess. It is oblique and converges towards the axis of the attachment 1 from the above edge.

A toe 22 extends over this second surface. The toe 22 extends over a length less than the lug 20. Its section is generally triangular, the projecting edge 23 being rounded. Seen in elevation (FIG. 1), the projecting edge 23 is offset outward relative to the remainder of the lug 20.

The flat third surface is opposite the root 21 and aligned with one of the surfaces of the toe 22.

Finally, the fourth surface is oblique and generally parallel to the second surface. The fourth surface includes two adjacent triangular wedge members 24 in the vicinity of the edge shared with the third surface.

The portion of the lug 20 that includes the toe 22 and the wedge members 24 is rigid.

The lugs 20 are offset axially because the ring 2 is thicker under one lug 20 than under the other.

The second body 3 includes a thick disk 30. The corner between its exterior surface 31 and its lateral surface is rounded whereas the corner between its interior surface 32 and its lateral surface is right-angled.

The exterior surface 31 features an oblong opening opening into a shallow imprint 33 for inserting a tool for screwing in the attachment 1.

The second body 3 further includes two flanges 34. Each flange 34 is connected to the second body 3 and to a portion of an arm 10 adjoining the second body 3. The two flanges 34 are symmetrical with respect to the axis of the attachment 1.

Each flange 34 is arcuate in shape and extends almost as far as the opposite arm 10.

At the junction with the arm 10, the flange 34 extends over approximately half the height of the arm 10. The height of the flange 34 decreases over a distance away from this junction and then remains constant.

The edge of the flange 34 facing the opposite arm 10 is pointed.

On its outside, facing a lug 20, the flange 34 has an increased thickness portion 35 that extends its whole height. On the side opposite the second body 3, the increased thickness portion 35 has a beveled edge over which extends a longitudinal enlargement 36 parallel to the edge. At the same level, the arm 10 corresponding also includes the same enlargement 36.

Between the beveled edge of the increased thickness portion 35 and the flat 7, which face each other, is a flexible strip 40 having two parallel edge surfaces. The strip 40 is flexible because it is relatively thin. The width of the strip 40 is equal to that of the toe 22. It is on the outside, opposite the recess of the attachment 1.

The disk 30 is offset with respect to the arms 10, the flanges 34 and the strips 40.

In the present example a skirt 51 is nested over the attachment 1 to form an obturator 50. The skirt 51 is of molded plastics material and includes a flange 52 with a rounded profile extending from a nesting cylinder 53. The skirt 51 is more flexible than the attachment 1.

The height of the cylinder 53 corresponds to the distance between the interior surface 32 of the disk 30 and the enlargement 36. In the present example the height of the skirt 51 is less than the height of the attachment 1.

When the skirt 51 is nested over the attachment 1, the cylinder 53 abuts against the rim of the disk 30 and the enlargement 36 assumes a position just under the junction of the flange 52 with the cylinder 53.

When the attachment 1 is threaded over a stud 60 (FIG. 8 or 9), the force on the first body 2 is transmitted by the rigid arms. The wedge members 24 of a first lug 20 come into contact with the stud 60. By pivoting, the lug 20 moves away so that the wedge members 24 can climb a flank of the thread of the stud 60. The second lug 20 rapidly reaches the stud 60 and also moves away.

With the insertion of the stud 60, the lugs 20 are farther apart than in the rest state and the toes 22 come into contact with the flexible strips 40.

When the wedge members 24 reach and pass the apex of the thread, because of the effect of the nesting force and the tension of the flexible strips, the attachment 1 moves a little further onto the stud 60. The flexible strips push the lugs 20 towards the bottom of the thread, which makes a sharp sound. When the attachment 1 is fitted, the above events occur in quick succession and a succession of clicks is heard.

Figures 8, 9:
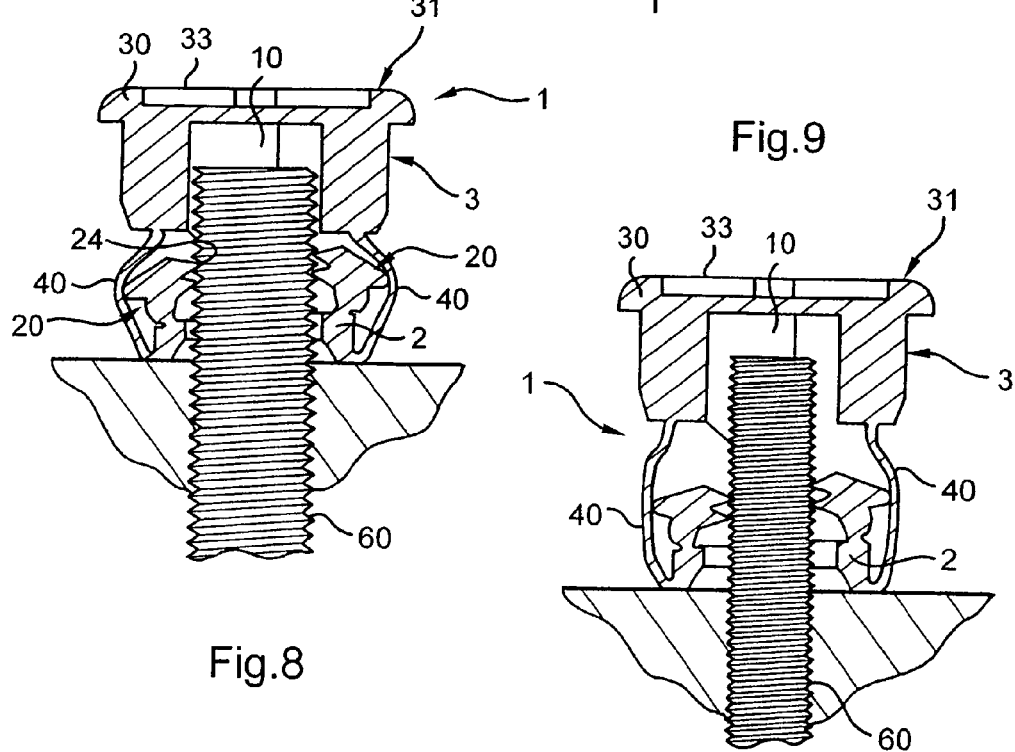
FIGS. 8 and 9 are views in section taken along the line IV-IV in FIG. 3 showing studs of large and small diameter, respectively.

Because of the flexibility of the lugs 20 at the level of their root 21, the attachment 1 is suitable for a plurality of diameters of the stud 60, as shown in FIGS. 8 and 9.

The lugs each include two wedge members and the stud is gripped on each side between two wedge members 24. Unscrewing is possible directly on the lugs, despite their flexibility.

With the attachment 1 threaded over a stud 60, the flexible strips 40 are tensioned and hold the lugs 20 against the stud 60. If removal of the member 1 is attempted and tension is exerted along the axis of the attachment 1, the lugs 2 are braced and the strips 40 are tensioned further. Thus the lugs are retained even more firmly on the stud 60.

If greater traction is applied from one side, the first body 2 pivots slightly relative to the arms 10 and the flexible strip 40 on this side stretches further. The pressure of the strip 40 on the corresponding lug 20 is greater, whereas the other lug 20 is still retained by the cooperation of the wedge member 24 and the thread and by the strip 40, which remains tight.

To separate the attachment 1 from the stud 60, it is sufficient for the user to unscrew the attachment 1, for example using a tool inserted in the imprint 33.

When the stud 60 is used facing a hole in a panel, the attachment 1 is capped by the skirt 51 to form the obturator 50 that is then fixed to the stud 60 and conceals the hole in the panel.

Alternatively, the component 1 is used with no skirt or in cooperation with another part.

In variants that are not shown, the shape and the dimensions of the various parts constituting the attachment 1 are different, for example, there are provided three lugs and only one rigid arm, and/or the lug portion including the teeth and the toe is connected to the remainder of the first body by a flexible and elongate portion.

The present invention is not limited to the embodiment described and shown and encompasses any variant execution thereof.

The invention claimed is:

1. Female attachment of plastics material having a recess and at least two lugs projecting into said recess for clipping said attachment to a stud engaged in said recess, said attachment comprising:

at a first end, a first body having a central opening, at a second end, opposite said first end, a second body, and connecting members connecting between said first body and said second body and delimiting said recess, which is open at said first end via said central opening of said first body, said connecting members comprising at least one rigid arm and at least two flexible strips that are separated from each other, each of said strips being disposed facing one of said lugs, opposite said recess, each of said lugs being connected to said first body and comprising a rigid portion having teeth adapted to engage with the thread of said stud and a toe opposite said teeth facing a respective one of said strips.

2. Attachment according to claim 1, wherein said teeth comprise two adjacent wedge members adapted to engage with said thread.

3. Attachment according to claim 1, wherein each of said lugs has a free end opposite said first body, at least one lug having its free end axially offset relative to the free end of another lug.

4. Attachment according to claim 1, wherein each of said lugs comprises a portion forming a hinge between said rigid portion and said first body.

5. Attachment according to claim 1, wherein said attachment comprises exactly two arms and two lugs, said arms and said lugs being disposed in a regularly alternating manner.

6. Attachment according to claim 1, wherein said first body has a beveled rim facing said recess along said opening.

7. Attachment according to claim 1, wherein a flange of arcuate shape connected to said second body extends from each of said arms in the direction of the opposite arm, each of said strips being connected to a respective one of said flanges.

* * * * *